United States Patent [19]

Kingston et al.

[11] Patent Number: 5,022,048

[45] Date of Patent: Jun. 4, 1991

[54] PROGRAMMABLE DIGITAL FREQUENCY-PHASE DISCRIMINATOR

[75] Inventors: Samuel C. Kingston; Steven T. Barham, both of Salt Lake City; Harold L. Simonsen, West Valley City, all of Utah

[73] Assignee: Unisys Corp., Blue Bell, Pa.

[21] Appl. No.: 559,016

[22] Filed: Jul. 26, 1990

[51] Int. Cl.⁵ .................................... H04L 27/30
[52] U.S. Cl. ...................... 375/1; 307/510; 307/511; 307/514; 328/133
[58] Field of Search ............... 328/133, 134; 307/231, 307/514, 526, 510, 511, 512, 517, 520, 521, 525

[56] References Cited

U.S. PATENT DOCUMENTS 4,739,278  4/1988  Des Brisay, Jr. et al. .......... 328/133

Primary Examiner—Bernarr E. Gregory
Attorney, Agent, or Firm—John B. Sowell; Mark T. Starr; Thomas J. Scott

[57] ABSTRACT

A present invention novel frequency-phase discriminator has input channels for real and imaginary data which are coupled to two programmable despreaders. The first despreader has its real and imaginary outputs coupled to individual programmable data rate filters which have their individual outputs coupled to a quadrant detector that generates a phase angle direction signal and sign magnitude. The second despread has its real and imaginary outputs connected through individual programmable inverters to data rate filters which have their individual outputs coupled to a quadrant selector that selects error signal data rate information from one of four quadrant axes signals. A command generator is programmably coupled to the output of the quadrant detector and to the input of the quadrant selector and provides a selection signal to the quadrant selector which produces a frequency error signal output employed in a frequency lock loop or in a phase lock loop.

11 Claims, 3 Drawing Sheets

PROGRAMMABLE DIGITAL FREQUENCY-PHASE DISCRIMINATOR

BACKGROUND OF THE INVENTION

1. Field of the Invention

The present invention relates to discriminators for use in phase lock loops and frequency lock loops of a communication receiver. More particularly the present invention relates to a novel programmable digital frequency discriminator which is command programmable to operate as a phase discriminator.

2. Description of the Prior Art

Heretofore, analog phase lock loops have been provided with frequency sweep circuits. Such adjunct circuits were employed to achieve frequency acquisition lock and then disabled so that the phase could be acquired and tracked by the phase lock loop.

Heretofore, digital frequency lock loops and digital phase lock loops have been proposed as separate circuits on separate semiconductor chips. Such circuits have been arranged in a module or as additional circuitry to be sequentially operated, however, this would create a condition or requirement for additional logic circuit chips and/or discrete components. There is a present need for a simple and inexpensive digital discriminator capable of being implement on a single very large scale integrated circuit that is externally programmable.

SUMMARY OF THE INVENTION

It is a primary object of the present invention to provide a novel programmable digital frequency-phase discriminator.

It is a primary object of the present invention to provide a novel dual purpose discriminator.

It is a primary object of the present invention to provide a novel dual purpose frequency-phase discriminator which acquires frequency and reconfigures itself as a phase discriminator.

It is a principal object of the present invention to provide a frequency discriminator and a phase discriminator which mutually share the same hardware circuitry of a very large scale integrated circuit chip.

It is a principal object of the present invention to provide a novel discriminator that is command programmable to change chip rates, data rates, despreader mode and loop filter gains among other programmable features.

It is another object of the present invention to provide a novel discriminator which tracks the I channel or the Q or a composite of the I and Q channels.

It is another object of the present invention to provide a novel dual purpose discriminator which is simple and easily implemented in a single very large scale integrated circuit chip with other logic components.

It is another object of the present invention to provide a novel frequency discriminator which is converted or reconfigured into a phase discriminator by programmably eliminating a pair of inverters in the frequency discriminator.

According to these and other objects of the present invention, there is provide a novel frequency-phase discriminator with real (I) and imaginary (Q) data inputs which are coupled to two programmable despreaders. The first despreader has its real and imaginary outputs coupled to individual programmable data rate filters having their individual outputs coupled to a quadrant detector that generates a phase angle direction signal. The second despreader has its real and imaginary outputs connected through series connected inverters to individual programmable data rate filters having their individual outputs coupled to a quadrant selector that selects error signal data information from one of the four quadrant axes signals at its input. A command generator is coupled to the quadrant detector and to the quadrant selector and provides the selection signal to the quadrant selector which produces a frequency error output or a phase error output which is employed in a frequency lock loop or a phase lock loop.

DESCRIPTION OF THE PREFERRED EMBODIMENT

Figure 1:
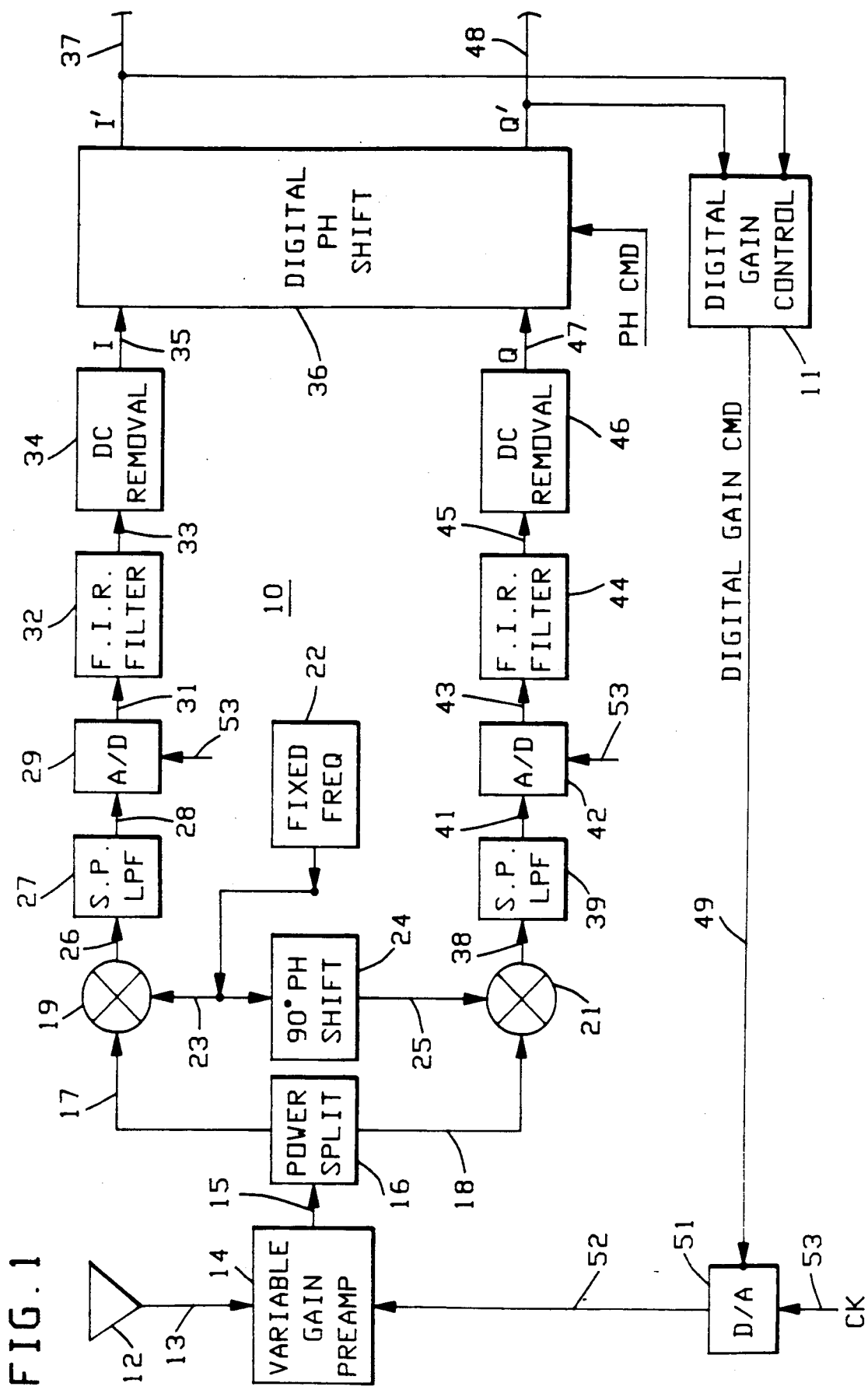
FIG. 1 is a schematic block diagram of a communications receiver pre-processing circuit illustrating a preferred use of the present invention programmable digital discriminator.

Refer now to FIG. 1 showing the present invention programmable digital gain controller 11 connected to a data stream of a digital sample data communications receiver 10. The radio frequency signals received by the antenna 12 are coupled via line 13 as analog signals to a variable gain preamplifier 14 to provide a controlled level output signal on line 15 to power splitter 16. The RF analog signal on lines 17 and 18 are applied to a pair of mixers 19 and 21 connected to the real and imaginary channels I and Q respectively. A fixed frequency oscillator 22 has an output on line 23 which is connected to mixer 19 and to a 90° phase shifter 24 which provides a quadrature output on line 25 to mixer 21. The real analog RF signal on line 26 is applied to a single pole low pass filter 27 to provide a filtered analog output signal on line 28. The analog signal at the input of A to D converter 29 is converted to a digital output on line 31 which is applied to a finite impulse response (FIR) filter 32 to provide a filtered digital signal on line 33 which has some D.C. component that is removed by D.C. removal circuit 34 to provide the real digital signal on line 35. The real digital signal on line 35 is applied to a digital phase shifter 36 of the type set forth in my U.S. Pat. No. 4,841,552 to provide a phase shifted signal on line 37 shown as I'.

In a manner similar to that described above, the output signal on line 38 in the imaginary channel Q is applied to a low pass filter 39 whose output on line 41 is applied to an A to D converter 42. The digital output on line 43 is applied to a filter 44 and the filtered output on line 45 is applied to a D.C. removal circuit 46 to provide the imaginary digital signal Q on line 47. The imaginary signal Q on line 47 is applied to the digital phase shifter 36 of the type described in U.S. Pat. No. 4,841,552 to provide the phase shifted imaginary signal Q' on line 48. The real and imaginary signals on line 37 and 48 are connected to a preferred embodiment digital gain controller 11 to provide a digital gain command on line 49 which is shown connected to digital to analog converter 51. The analog output on line 52 is connected to the analog variable gain preamplifier 14 to control the output signal on line 15 at a predetermined controlled level. When the variable gain preamplifier is provided with a digital input, the digital gain command on line 49 may be coupled directly to the preamplifier 14 so as to eliminate the D to A converter 51. Clock strobe signals controlled by the present invention such as that shown on line 53 are applied to the A to D converters 29 and 42 and the digital blocks which occur after. The low pass filters 27 and 39 may be constructed as RC filter circuits and the FIR filters 32 and 44 may be constructed in the manner shown in my U.S. Pat. No 4,808,939. It will be understood that all of schematic blocks shown in the FIG. 1 embodiment need not be constructed according to my previously mentioned patents but may be constructed by other equivalent circuits known in the prior art.

Figure 2:
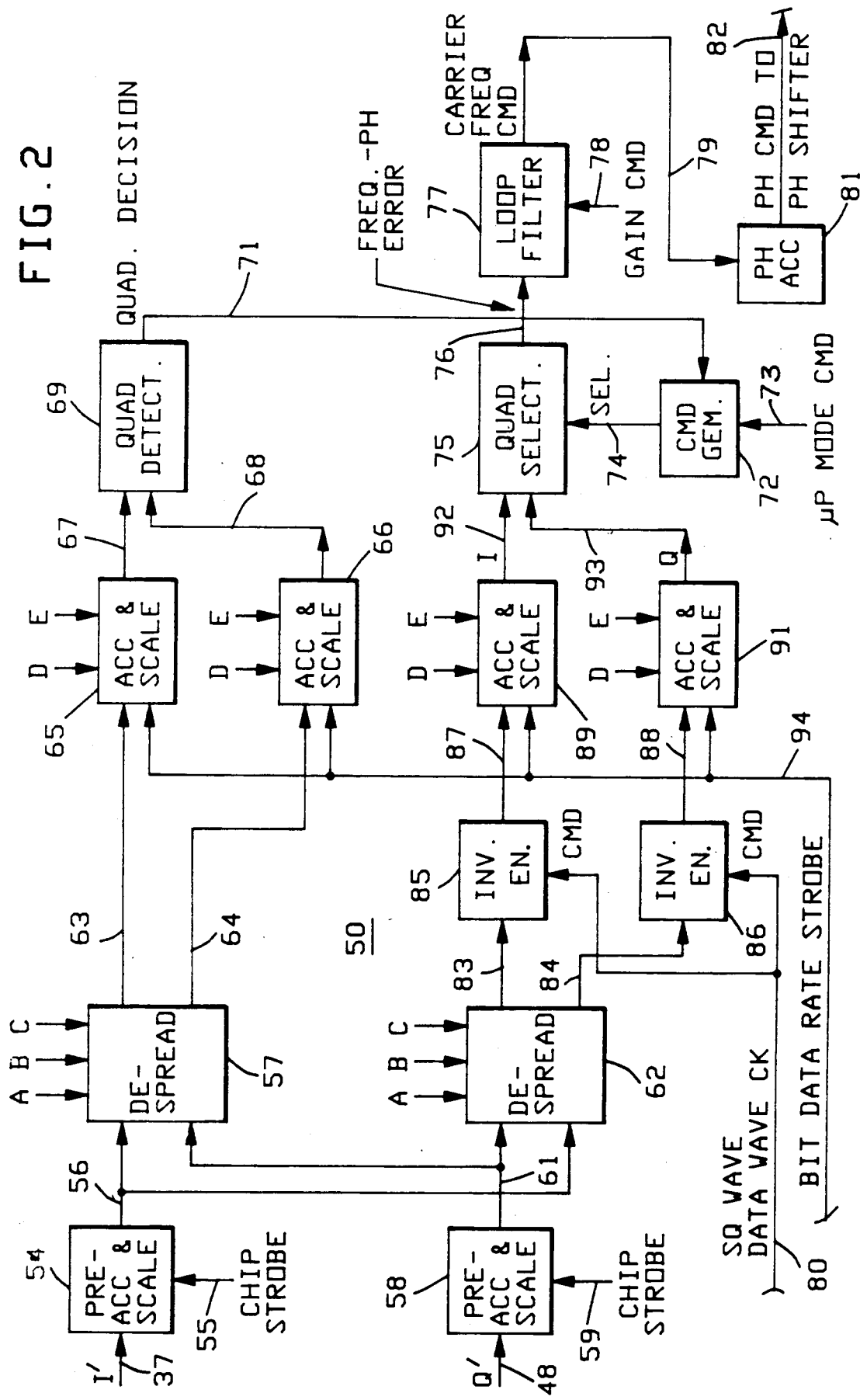
FIG. 2 is a schematic block diagram of a preferred embodiment of the present invention frequency-phase discriminator.

Refer now to FIG. 2 showing a schematic block diagram of a preferred embodiment programmable frequency-phase discriminator having a real and imaginary phase shifted data signals on input lines 37 and 48 respectively. The real phase shifted data signal on line 37 is applied to a pre-accumulate and scale circuit 54 which functionally acts as a programmable chip rate filter having a chip rate strobe input on line 55. The chip rate samples on output line 56 are applied to a first despreader 57. In similar manner, a second pre-accumulate and scale circuit 58 having a chip strobe input on line 59 provides a quadrature chip rate sample on output line 61 which is applied to a second despreader 62 and the first despreader 57. It will be understood that for some applications a single despreader may be employed for the two despreaders shown. The real and imaginary despread outputs on line 63 and 64 are applied as inputs to two accumulate and scale circuits which operate functionally as programmable data rate filters 65 and 66. The bit data rate samples on output lines 67 and 68 are applied to a quadrant detector 69 whose function will be explained in greater detail hereinafter. The output of the quadrant detector 69 is shown as a quadrant decision on output line 71 which is applied to a command generator 72 shown having a microprocessor mode command input on line 73. It will be understood that command generator 72 is remotely programmable via input line 73 and is shown here producing a selection signal on output line 74 which is applied to quadrant selection circuit 75 which produces at its output 76 a frequency error or a phase error signal which is applied to a loop filter 77. The loop filter 77 is shown having a programmable gain command input 78. The output signal produced by the loop filter 77 is a carrier frequency command on line 79 which is applied as an input to the phase accumulator 81 which produces as its output 82 a phase command which is applied to the phase shifter 36 shown in FIG. 1.

The real and imaginary despread outputs on lines 83 and 84 are shown being applied to a pair of command activated inverters 85 and 86. In the preferred embodiment of the present invention the command employed to actuate the inverters 85 and 86 is a square wave data symbol clock generated by the timing and control signals so as to activate the inverters when applied as a command. It will be understood that the absence of the square wave to the enable input of the inverters disables the inverters and allows the signals on lines 83 and 84 to be presented unaltered at the outputs 87 and 88. The signal on lines 87 and 88 are applied to individual accumulate and scale devices 89 and 91 to produce on output lines 92 and 93 bit rate data samples that are used for producing a carrier error correction signal. The unique quadrant selector 75 is capable of producing on output line 76 plus or minus I or Q so as to select either input and invert the output if needed. As described hereinbefore the frequency-phase error signal on line 76 is employed to generate the phase command on output line 82 which is employed as an input to the digital phase shifter 36 shown in FIG. 1.

The accumulate and scale circuits 65, 66, 89 and 81 are shown having the same bit data rate strobe input on line 94 which may be programmably changed so as to change the data rate. It will be understood that the common bit data rate strobe input on line 94 is the preferred embodiment for the present invention and different strobe rates may be employed in special cases.

A feature of the present invention is that the preferred embodiment accumulate and scale circuits and the despreaders are programmable. In order to simplify the explanation of FIG. 2 three inputs A, B and C are shown being applied to the despreaders 57 and 62. The A input is provided for the real (I) PN signal input. The B input is provided for the (Q) PN input and the programmable C input is for selecting either quad or two channel mode of operation. The D and E inputs to the accumulate and scale circuits are for the enable and strobe input signals from the timing and control circuits which are programmable.

Figure 3:
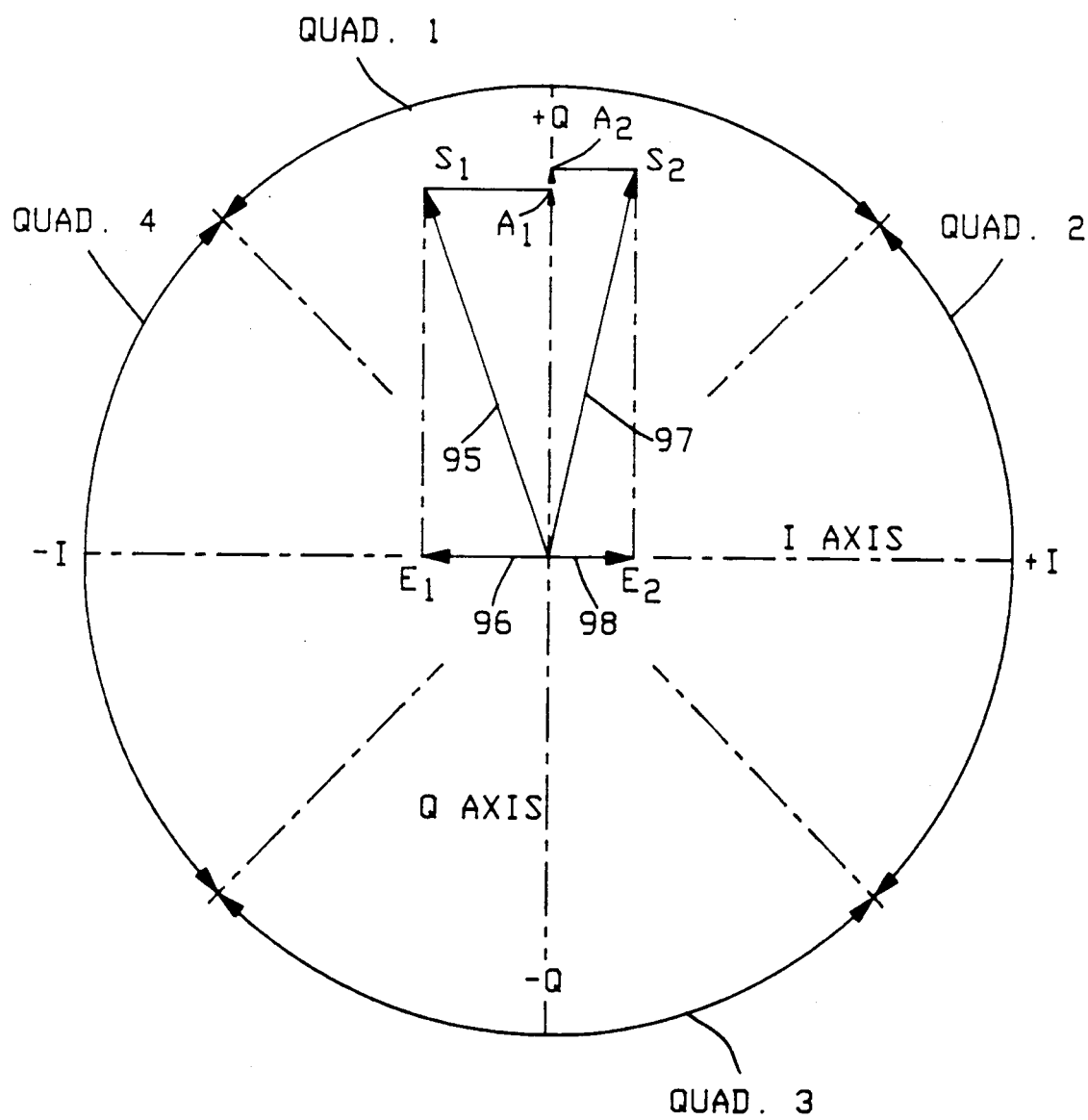
FIG. 3 is a phase diagram showing data signal amplitude and data signal phase angle.

Refer now to FIG. 3 showing a phase diagram which is employed to explain the quadrant selection and the generation of the phase error shown at the output of the accumulate and scale circuits 89 and 91 employed to generate the frequency or phase error signal that controls the phase shifter. FIG. 3 is shown having a horizontal real or I axis which extends in the plus and minus direction. The imaginary or Q axis is perpendicular to the I axis and extends through the origin or zero point of the axes. At any point in time the bit rate samples appearing on lines 92 and 93 have phase direction and may be represented as vectors which have an I component and a Q component. For example, vector S1 has a I axis component $E_1$ and a Q axis component $A_1$. The quadrant detector 69 determines which of the components $A_1$ or $E_1$ has the greatest magnitude and outputs a signal on line 71 indicative of which of the four quadrants shown in FIG. 3 has the greatest signal magnitude. It will be understood that the vector 95 shown as vector S1 could have been directed 180° opposite the S1 vector direction and would have a negative sign which would also appear on output line 71 as an input to the command generator 72. Had the vector 95 been negative it would have appeared as a quadrant 3 decision on output line 71. When the vector 95 is rotated clockwise to coincide with the plus Q axis, the error signal component $E_1$ will be eliminated. Accordingly the vector $E_1$ is indicative of the error signal to be applied to correct the phase direction of vector 95 appearing on lines 92 or 93, thus, $E_1$ represents the phase error. The novel quadrant selector 75 functionally selects the minus I vector $E_1$ as the error signal. Vector 96 shown as the error signal El is directed into quadrant 4 which lags the A1 vector directed into quadrant 1 by 90°. The quadrant selected for maximum power of any vector is as follows:

When Q>I and Q is positive quadrant 1 is indicated.
When I>Q and I is positive quadrant 2 is indicated.
When Q>I and Q is negative quadrant 3 is indicated.
When I>Q and I is negative quadrant 4 is indicated.

Thus, when we detect a quadrant Q1 we select the counter clockwise or lagging quadrant Q4 for the error signal or effectively rotate the decision by minus 90°.

Assume for the explanation of frequency correction error, as distinguished from phase correction error, that during the first half of the bit time vector 95 represents the average phase direction and during the latter part of the bit time vector 97 shown as S2 represents the average phase direction during the second half of the bit time. In this example the change or difference in phase direction may be represented by the two magnitudes or vectors 96 and 98. When the vector E1 is subtracted from the vector E2 a positive magnitude equal to the sum of vectors 96 and 98 is produced. The difference between the error vectors 96 and 98 approximates the difference in phase between the first half and the second half of the data bit. This magnitude represents the frequency error or the change in phase over the bit time. In order to make the subtraction of the first half of the bit time, the error signal component of the vector 95 is inverted in the inverters 85 and 86 before being presented to the accumulate and scale circuits 89 and 91.

The vectors 95 and 96 may appear in the same axis direction and the magnitude of the vector E2 minus E1 would be smaller than the sum of the vectors 96 and 98.

Having explained a preferred embodiment of the present invention employing the structure shown in FIG. 2 it will noW be understood that the normal use for the whole system is for coherent detection which requires phase tracking. When the novel system is employed for non-coherent detection it is not necessary to track the phase, however, the frequency discrimination and frequency track modes may employ the present invention circuits. Further, the preferred mode for enabling and disenabling the inverters used in the frequency error generation mode was found to be an already available square wave data symbol clock signal applied on line 80 which is generated in the timing and control circuits and which is programmable by the receiver microprocessor. However, other types of enabling and disenabling logic could be employed using logic signals.

The novel circuit shown in FIG. 2 is intended to be a discriminator component employed in a carrier frequency lock loop. Once the frequency is acquired or locked onto the same circuit is employed to achieve phase lock and subsequent tracking. The components used in the novel discriminator circuit 50 were selected for functional operation and ease of implementation as an integrated circuit. For example the accumulate and scale circuits are generically data rate filters which may be implemented by less desirable integrate and dump circuits.

In summary it will be understood that a phase lock loop which requires a discriminator is required for tracking and that the frequency lock loop using a frequency discriminator has been obtained basically for the cost of programmably inserting a single inverter into a preferred embodiment phase discriminator.

What is claimed is:

1. A programmable digital frequency-phase discriminator, comprising:
  a real (I) data channel for receiving input data,
  an imaginary (Q) data channel for receiving input data,
  a first programmable despreader coupled to said I data channel and to said Q data channel and having an I data output and a Q data output,
  first and second programmable data rate filter means connected to said I data output and said Q data output of said data rate filter means respectively,
  quadrant detector means having inputs coupled to the outputs of said first and second data filter means for determining the sign and quadrant phase angle of the largest magnitude I or Q component of data sample input,
  a second programmable despreader connected to said I data channel and to said Q data channel and having an I data output and a Q data output,
  third and fourth programmable data rate filter means connected to said I data despreader output and said Q data despreader output of said data rate filter means respectively,
  independently controlled inverters connected in series in said I data input lines and said Q data input lines to said third and fourth data rate filter means,
  quadrant selector means having inputs coupled to the output error signals from said third and said fourth data rate filter means for selection of an error signal output, and
  a command generator coupled to said quadrant detector and to said quadrant selector for generating a predetermined selected I data error signal or Q data error signal and for providing either a frequency or phase error output.

2. A programmable digital discriminator as set forth in claim 1 wherein said quadrant selector comprises means for inverting the largest magnitude I or Q input error signals.

3. A programmable digital discriminator as set forth in claim 2 wherein said I or Q input error data signals are representative of either frequency error signals $E_1$ or phase error signals $E_1$ plus or minus $E_2$.

4. A programmable digital discriminator as set forth in claim 1 which further includes means for enabling said commandably controlled inverters to provide a frequency error signal output from said quadrant selector.

5. A programmable digital discriminator as set forth in claim 4 which further includes a loop filter coupled to the output error signal from said quadrant selector for producing a carrier frequency command output signal.

6. A programmable digital discriminator as set forth in claim 5 which further includes a phase accumulator coupled to the output of said loop filter for producing a phrase command.

7. A programmable digital discriminator as set forth in claim 1 which further includes means for disabling said commandably controlled inverters to provide a phase error signal output from said quadrant selector.

8. A programmable digital discriminator as set forth in claim 7 which further includes a loop filter coupled to the error signal output from said quadrant selector for producing a carrier phase command output signal.

9. A programmable digital discriminator as set forth in claim 8 which further includes a phase accumulator coupled to the output of said loop filter for producing a phase command.

10. A programmable digital discriminator as set forth in claim 9 wherein said data rate filter means comprise accumulate and scale circuits.

11. A programmable digital discriminator as set forth in claim 1 wherein said data rate filters comprise accumulate and scale circuits.

* * * * *